United States Patent
Yokoyama et al.

(10) Patent No.: US 12,024,044 B2
(45) Date of Patent: Jul. 2, 2024

(54) CHARGE CONTROL SYSTEM, CHARGE CONTROL DEVICE, AND RECORDING MEDIUM

(71) Applicant: TOYOTA JIDOSHA KABUSHIKI KAISHA, Toyota (JP)

(72) Inventors: Daiki Yokoyama, Gotemba (JP); Daiki Kawachino, Sunto-gun (JP); Shota Tsukamoto, Susono (JP); Rie Yayabe, Susono (JP); Masaaki Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 458 days.

(21) Appl. No.: 17/522,228

(22) Filed: Nov. 9, 2021

(65) Prior Publication Data

US 2022/0169136 A1 Jun. 2, 2022

(30) Foreign Application Priority Data

Nov. 30, 2020 (JP) ................................. 2020-198874

(51) Int. Cl.
*H02J 7/00* (2006.01)
*B60L 53/62* (2019.01)

(52) U.S. Cl.
CPC ............ *B60L 53/62* (2019.02); *H02J 7/0048* (2020.01); *H02J 7/007182* (2020.01)

(58) Field of Classification Search
USPC ........................................................ 320/109
See application file for complete search history.

(56) References Cited

U.S. PATENT DOCUMENTS

| | | | | |
|---|---|---|---|---|
| 2011/0032110 A1* | 2/2011 | Taguchi | ................... | B60L 3/12 340/636.1 |
| 2012/0303259 A1* | 11/2012 | Prosser | ................... | B60L 53/57 701/400 |
| 2015/0158393 A1* | 6/2015 | Kawano | ................. | G06Q 10/04 320/109 |
| 2016/0185246 A1* | 6/2016 | Paul | ........................ | B60L 53/65 320/106 |
| 2022/0005113 A1* | 1/2022 | Kimura | .................. | G06Q 10/02 |

FOREIGN PATENT DOCUMENTS

JP 2013-69084 A 4/2013

\* cited by examiner

*Primary Examiner* — Samuel Berhanu
(74) *Attorney, Agent, or Firm* — Oblon, McClelland, Maier & Neustadt, L.L.P.

(57) ABSTRACT

A charge control system includes: a charging apparatus; and a charge control device including a processor calculating a charge amount of the charging apparatus and perform charging control. Further, the charge amount is calculated in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

9 Claims, 2 Drawing Sheets

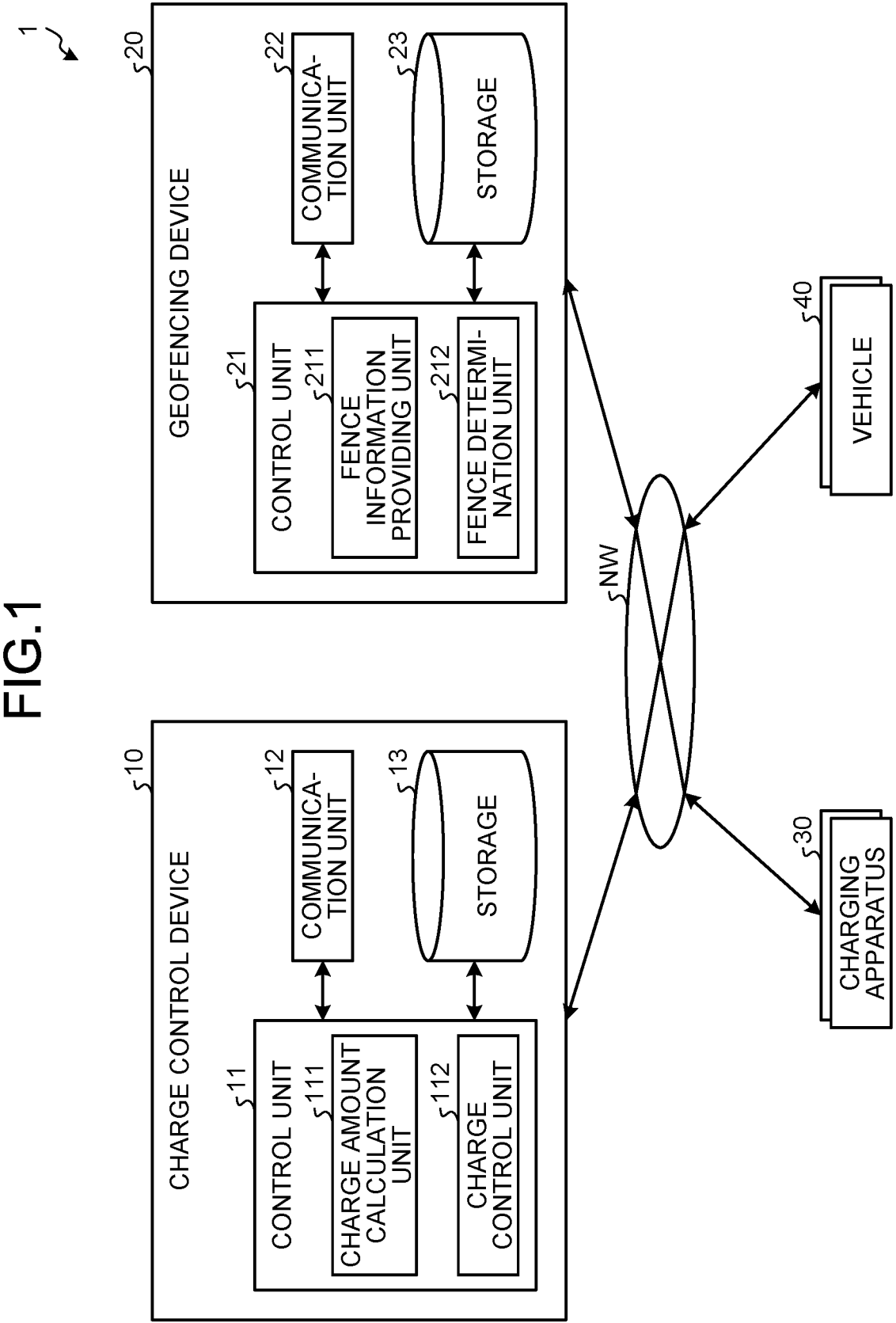

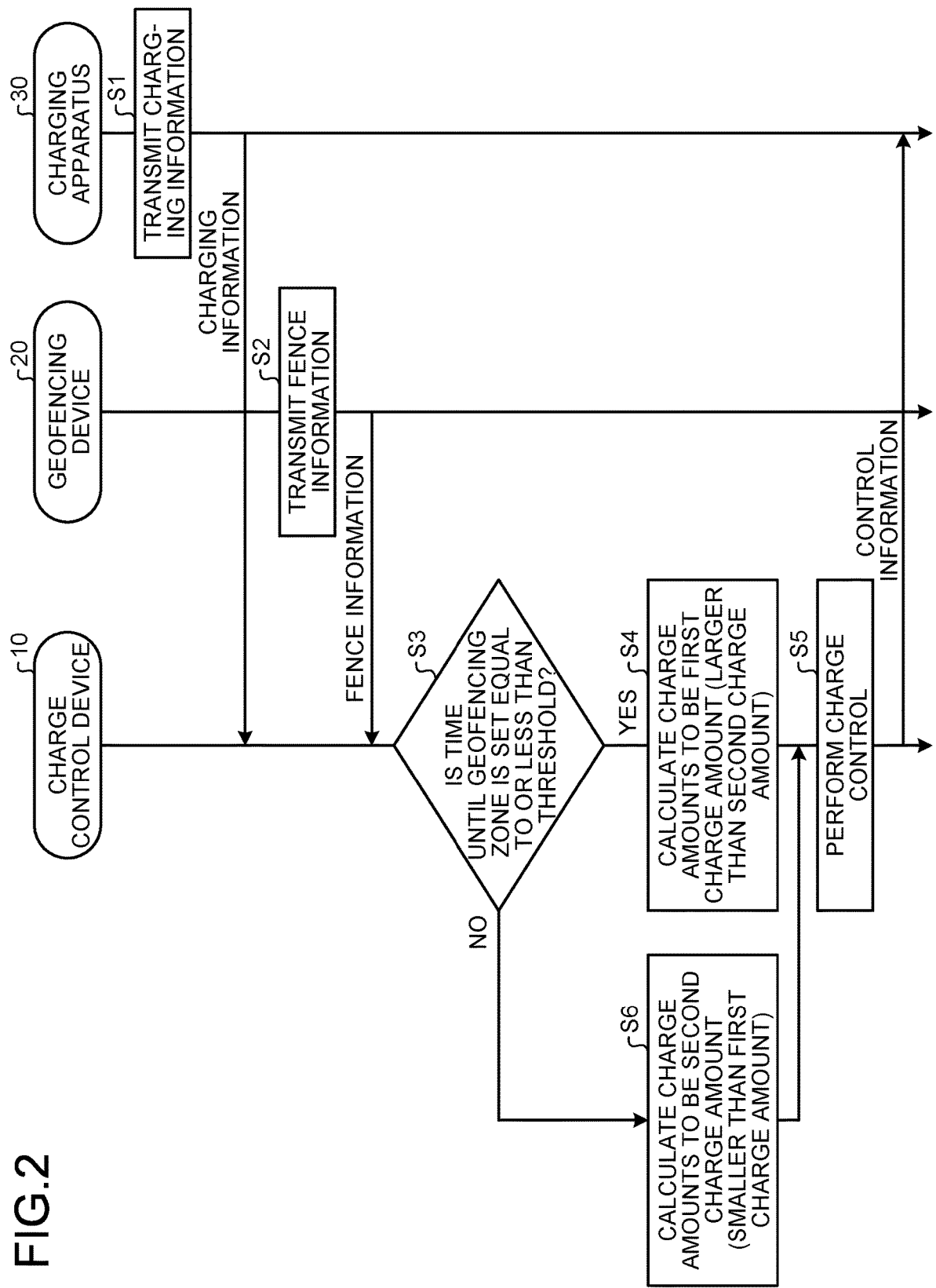

CHARGE CONTROL SYSTEM, CHARGE CONTROL DEVICE, AND RECORDING MEDIUM

CROSS-REFERENCE TO RELATED APPLICATION(S)

The present application claims priority to and incorporates by reference the entire contents of Japanese Patent Application No. 2020-198874 filed in Japan on Nov. 30, 2020.

BACKGROUND

The present disclosure relates to a charge control system, a charge control device, and a recording medium.

In a smart city, a technique for supplying electric power stored in a charging apparatus in advance to a facility group arranged in the city is known (for example, see Japanese Laid-open Patent Publication No. 2013-069084).

SUMMARY

There is a need for providing a charge control system, a charge control device, and a recording medium storing a charge control program capable of suppressing, in advance, electric power shortage due to a geofencing zone set in a smart city.

According to an embodiment, a charge control system includes: a charging apparatus including a first processor to cause the charging apparatus to store electric power to be supplied to a preset region; and a charge control device including a second processor to calculate a charge amount of the charging apparatus and perform charging control for the charging apparatus based on the calculated charge amount. Further, in the region, at a preset time point, an engine driving prohibited zone is set where driving of an engine of a vehicle traveling in the region is prohibited, and the second processor calculates the charge amount in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

According to an embodiment, a charge control device includes: a processor to calculate a charge amount of a charging apparatus that stores electric power to be supplied to a preset region, and perform charging control for the charging apparatus based on the calculated charge amount, Further, in the region, at a preset time point, an engine driving prohibited zone is set where driving of an engine of a vehicle traveling in the region is prohibited, and the processor calculates the charge amount in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

According to an embodiment, a non-transitory computer-readable recording medium storing a charge control program that causes a processor to: calculate, at a preset time point, a charge amount of a charging apparatus that stores electric power to be supplied to a preset region in which an engine driving prohibited zone is set where driving of an engine of a vehicle traveling in the region is prohibited; and perform charging control for the charging apparatus based on the calculated charge amount. Further, in the calculating, the charge amount is calculated in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

BRIEF DESCRIPTION OF THE DRAWINGS

FIG. 1 is a block diagram illustrating details of each component of a charge control system according to an embodiment; and FIG. 2 is a flowchart illustrating an example of a charge control method performed by the charge control system according to the embodiment.

DETAILED DESCRIPTION

When a zone where driving of an engine of a vehicle is prohibited (exhaust gas control zone, hereinafter referred to as "geofencing zone") is set in a smart city, a demand for charging vehicles in the smart city increases. Therefore, there has been a demand for a technique capable of suppressing, in advance, electric power shortage due to a geofencing zone set in a smart city.

A charge control system, a charge control device, and a recording medium storing a charge control program according to an embodiment of the present disclosure will be described with reference to the drawings. The components in the following embodiment include those that can be easily replaced by those skilled in the art, or those that are substantially the same.

Charge Control System

A charge control system including a charge control device according to the embodiment will be described with reference to FIG. 1. The charge control system is for performing charge control for a charging apparatus that supplies electric power to a preset region. The "preset region" is a region where a large number of users live or what a large number of users use, and examples thereof include a smart city, a theme park, a leisure land, and the like. In the present embodiment, a description will be given assuming that this region is a smart city.

In the present embodiment, it is assumed that a geofencing zone (engine driving prohibited zone) is to be set in the smart city at a preset time point. Geofencing refers to a mechanism in which a virtual fence (geofence) is set around a specific zone and driving of an engine of a vehicle is prohibited in the zone (geofencing zone).

In the geofencing zone, vehicles can only travel in the electric vehicle (EV) mode, and if an engine is driven, a predetermined penalty is imposed. This penalty is determined by, for example, laws and regulations of local governments or the like. Examples of the penalty include payment of a tax or a fine, a running limit or a running prohibition in the geofencing zone, and the like.

As illustrated in FIG. 1, a charge control system 1 includes a charge control device 10, a geofencing device 20, a plurality of charging apparatuses 30, and a plurality of vehicles 40. The charge control device 10, the geofencing device 20, the charging apparatuses 30, and the vehicles 40 all have a communication function, and are configured to be able to communicate with each other through a network NW. The network NW includes, for example, the Internet line network, a mobile phone line network, and the like.

Charge Control Device

The charge control device 10 is provided inside the smart city or outside the smart city. This charge control device 10 is implemented by, for example, a general-purpose computer such as a workstation or a personal computer, for example.

As illustrated in FIG. 1, the charge control device 10 includes a control unit 11, a communication unit 12, and a storage 13. Specifically, the control unit 11 includes a processor including a central processing unit (CPU), a digital signal processor (DSP), or a field-programmable gate array (FPGA), and a memory (main storage) including a random access memory (RAM), a read only memory (ROM), or the like.

The control unit 11 loads a program stored in the storage 13 into the work area of the main storage, executes the program, and controls each of the components and the like through the execution of the program to implement functions that meet a predetermined purpose. The control unit 11 functions as a charge amount calculation unit 111 and a charge control unit 112 through execution of a program stored in the storage 13.

The charge amount calculation unit 111 calculates charge amounts of the charging apparatuses 30. The charge amount calculation unit 111 first acquires fence information from a fence information providing unit 211 of the geofencing device 20. The fence information is information related to a geofencing zone to be set in the smart city, and is stored in a storage 23, for example. Furthermore, examples of the fence information include a zone around which the geofencing zone is to be set in the smart city, a time during which the geofencing zone is to be set (setting start time and setting end time), and the like.

When calculating the charge amounts of the charging apparatuses 30, the charge amount calculation unit 111 calculates the charge amounts to be larger in a case where the time length until the geofencing zone is set in the smart city from a predetermined reference time point is short than that in a case where the time length until the geofencing zone is set from the reference time point is long. For example, the charge amount calculation unit 111 calculates the charge amounts to be larger in a case where the time from the current time point (or the time point at which the charge amounts are calculated) to the time when the geofencing zone is to be set is equal to or less than a preset threshold than that in a case where the time length from the current time point (or the time point at which the charge amounts are calculated) to the time point when the geofencing zone is to be set exceeds the threshold. When the geofencing zone is set in the smart city, a demand for charging the vehicles 40 increases. However, by thus increasing the charge amounts in advance, it is possible to suppress electric power shortage in advance. The threshold used when the charge amounts are calculated to be larger can be experimentally or empirically acquired.

A specific increase amount of the charge amounts in a case where the geofencing zone is set in the smart city can be determined in various methods. For example, a method of increasing the charge amounts by a predetermined amount that has been determined based on a past case, a method of determining the increase amount based on traffic volume data such as the number, travel distances, travel areas, and travel time lengths of the vehicles 40 traveling in the smart city during the time when the geofencing zone is set, a method of acquiring information about remaining electric power (hereinafter, "state of charge (SOC) information") from each vehicle 40 via the network NW and determining the increase amount based on the SOC information or the like can be used.

In addition, when calculating the charge amounts of the charging apparatuses 30, the charge amount calculation unit 111 may calculate the charge amounts to be larger as the area of the geofencing zone to be set in the smart city is larger. The demand for charging the vehicles 40 in the smart city is more as the area around which the geofencing zone is to be set is larger, but by thus setting the charge amounts larger according to the area of the geofencing zone, it is possible to cope with the increase in the demand for charging the vehicles 40.

In addition, when calculating the charge amounts of the charging apparatuses 30, the charge amount calculation unit 111 may calculate the charge amounts to be larger as the time period of the geofencing zone to be set in the smart city is longer. The demand for charging the vehicles 40 in the smart city is more as the time period during which the geofencing zone is set is longer, but by thus setting the charge amounts larger according to the time period of the geofencing zone, it is possible to cope with the increase in the demand for charging the vehicles 40.

The charge control unit 112 performs charge control for the charging apparatuses 30 based on the charge amounts calculated by the charge amount calculation unit 111. A specific method of the charge control by the charge control unit 112 is not particularly limited, and for example, the charge amount calculation unit 111 may perform the charge control by transmitting a command to set the charge amounts at the time or in the future to be larger or smaller to the charging apparatuses 30 based on the charge amounts calculated at predetermined periods.

The communication unit 12 includes, for example, a local area network (LAN) interface board, a wireless communication circuit for wireless communication, and the like. The communication unit 12 is connected to the network NW such as the Internet, which is a public communication network. The communication unit 12 communicates with the geofencing device 20, the charging apparatuses 30, and the vehicles 40 by connecting to the network NW.

The storage 13 includes a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a Blu-ray (registered trademark) disc (BD). The storage 13 can store an operating system (OS), various programs, various tables, various databases, and the like. In addition, for example, the fence information acquired from the fence information providing unit 211, the charge amounts of the charging apparatuses 30 calculated by the charge amount calculation unit 111, and the like are stored in the storage 13 as necessary.

Geofencing Device

The geofencing device 20 is a device for performing processing related to geofencing, and is provided inside or outside the smart city. This geofencing device 20 is implemented by, for example, a general-purpose computer such as a workstation or a personal computer.

As illustrated in FIG. 1, the geofencing device 20 includes a control unit 21, a communication unit 22, and a storage 23. The control unit 21 functions as the fence information providing unit 211 and a fence determination unit 212 through execution of a program stored in the storage 23. The communication unit 22 communicates with the charge control device 10, the charging apparatuses 30, and the vehicles 40 by connecting to the network NW. Furthermore, in the storage 13, for example, fence information and the like are stored as necessary.

The fence information providing unit 211 transmits the fence information stored in the storage 23 to the charge control device 10. Before a geofencing zone is set in the smart city, the fence information providing unit 211 transmits fence information including a zone around which the geofencing zone is to be set, a time during which the geofencing zone is to be set (setting start time and setting end time), and the like to the charge control device 10.

The fence determination unit 212 determines whether the vehicles 40 have entered the geofencing zone. The fence determination unit 212 collects pieces of position information (hereinafter, referred to as "vehicle position information") of the vehicles 40 from the vehicles 40 via the network NW. Subsequently, the fence determination unit 212 determines whether the vehicles 40 have entered the geofencing zone based on the vehicle position information and the fence information stored in the storage 23. Then, the fence determination unit 212 outputs information regarding whether the vehicles 40 have entered the geofencing zone (hereinafter, referred to as "fence determination information") to the vehicles 40 through the network NW. Note that when the vehicles 40 enter the geofencing zone and when the vehicles 40 exit the geofencing zone, the fence determination unit 212 transmits fence determination information to that effect to the vehicles 40.

Charging Apparatus

The charging apparatuses 30 are for storing electric power to be supplied to the smart city, and are provided inside or outside the smart city. These charging apparatuses 30 each are implemented by, for example, a general-purpose computer such as a workstation or a personal computer. In addition, the charging apparatuses 30 each incorporate a battery for storing electric power, a control mechanism for controlling charging and discharging of electric power, and the like. In addition, the charging apparatuses 30 transmit charging information regarding the charging apparatuses 30 at the time to the charge control device 10 occasionally or at predetermined periods.

Vehicle

The vehicles 40 are moving bodies that travel inside and outside the smart city. The vehicles 40 include, for example, an electric vehicle, a plug-in hybrid vehicle, and the like, and are charged at a charging stand (contact charging stand or a non-contact charging stand) installed in the smart city. The vehicles 40 acquire fence determination information from the geofencing device 20 when the vehicles themselves enter the geofencing zone and when the vehicles themselves exit the geofencing zone. In addition, the vehicles 40 acquire vehicle position information through in-vehicle devices or the like having a GPS receiving function, and transmit the acquired vehicle position information to the geofencing device 20 occasionally or at predetermined periods.

Charge Control Method

An example of a processing procedure of the charge control method performed by the charge control system 1 according to the embodiment will be described with reference to FIG. 2.

First, the charging apparatuses 30 transmit charging information to the charge control device 10 (step S1). Subsequently, the fence information providing unit 211 of the geofencing device 20 transmits the fence information to the charge control device 10 (step S2). Note that the order of steps S1 and S2 may be reversed.

Subsequently, the charge amount calculation unit 111 of the charge control device 10 determines whether the time until the geofencing zone is set in the smart city is equal to or less than a preset threshold based on the fence information (step S3). When the charge amount calculation unit 111 determines that the time until the geofencing zone is set in the smart city is equal to or less than the threshold (Yes in step S3), the charge amount calculation unit 111 calculates the charge amounts to be a first charge amount (step S4). Subsequently, the charge control unit 112 performs charge control for the charging apparatuses 30 based on the calculated charge amounts (step S5).

When it is determined in step S3 that the time until the geofencing zone is set in the smart city exceeds the threshold (No in step S3), the charge amount calculation unit 111 calculates the charge amounts to be a second charge amount smaller than the first charge amount (step S6), and the processing proceeds to step S5. Thus, the processing of the charge control method is completed.

As described above, according to the charge control system, the charge control device, and the recording medium storing the charge control program according to the embodiment, it is possible to suppress electric power shortage in advance in a case where the geofencing zone is set in the smart city.

That is, in a case where the geofencing zone is set in the smart city, the demand for charging the vehicles 40 increases, and thus, there is a possibility that the electric power supplied to other facilities and facility groups in the smart city becomes insufficient. On the other hand, according to the charge control system, the charge control device, and the recording medium storing the charge control program according to the embodiment, the charging control for the charging apparatuses 30 is performed such that the charge amounts are larger in a case where the time from a predetermined reference time point (for example, at the time point, or the time when the charge amounts are calculated) until the geofencing zone is set in the smart city is short than that in a case where the time from the reference time point until the geofencing zone is set is long. Therefore, electric power shortage does not occur at the time when the geofencing zone is set.

Furthermore, according to the charge control system, the charge control device, and the recording medium storing the charge control program according to the embodiment, the charge control is performed such that more electric power than consumed is not stored in the charging apparatuses 30. Thus, waste of electric power and deterioration of the battery can be suppressed.

According to the present disclosure, electric power shortage when a geofencing zone is set in a smart city can be suppressed in advance.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge control system comprising:
    a charging apparatus including a first processor configured to cause the charging apparatus to store electric power to be supplied to a preset region; and
    a charge control device including a second processor configured to calculate a charge amount of the charging apparatus and perform charging control for the charging apparatus based on the calculated charge amount, wherein
    in the region, at a preset time point, an engine driving prohibited zone is set where driving of an engine of a vehicle traveling in the region is prohibited, and
    the second processor calculates the charge amount in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

2. The charge control system according to claim 1, wherein the second processor calculates the charge amount in a manner that the larger the size of the engine driving prohibited zone is, the greater the charge amount is.

3. The charge control system according to claim 1, wherein the second processor calculates the charge amount in a manner that the longer a period in which the engine driving prohibited zone is being set, the greater the charge amount is.

4. A charge control device comprising:
    a processor configured to
    calculate a charge amount of a charging apparatus that stores electric power to be supplied to a preset region, and
    perform charging control for the charging apparatus based on the calculated charge amount, wherein
    in the region, at a preset time point, an engine driving prohibited zone is set where driving of an engine of a vehicle traveling in the region is prohibited, and
    the processor calculates the charge amount in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

5. The charge control device according to claim 4, wherein the second processor calculates the charge amount in a manner that the larger the size of the engine driving prohibited zone is, the greater the charge amount is.

6. The charge control device according to claim 4, wherein the second processor calculates the charge amount in a manner that the longer a period in which the engine driving prohibited zone is being set, the greater the charge amount is.

7. A non-transitory computer-readable recording medium storing a charge control program that causes a processor to:
    calculate, at a preset time point, a charge amount of a charging apparatus that stores electric power to be supplied to a preset region in which an engine driving prohibited zone is set where driving of an engine of a vehicle traveling in the region is prohibited; and
    perform charging control for the charging apparatus based on the calculated charge amount, wherein
    in the calculating, the charge amount is calculated in a manner that a first charge amount is greater than a second charge amount, the first charge amount being the charger amount which is charged in a first time period which is from a predetermined reference time point until the engine driving prohibited zone is set, the second charge amount being the charger amount which is charged in a second time period which is from the predetermined reference time point until the engine driving prohibited zone is set, and the first time period being shorter than the second time period.

8. The non-transitory computer-readable recording medium storing the charge control program according to claim 7, wherein, in the calculating, the larger the size of the engine driving prohibited zone is, the greater the charge amount is.

9. The non-transitory computer-readable recording medium storing the charge control program according to claim 7, wherein, in the calculating, the longer a period in which the engine driving prohibited zone is being set, the greater the charge amount is.

* * * * *